United States Patent
Shimakawa et al.

(10) Patent No.: US 8,228,554 B2
(45) Date of Patent: Jul. 24, 2012

(54) INK JET PRINTING APPARATUS, IMAGE PROCESSING APPARATUS, AND METHOD FOR PROCESSING IMAGE

(75) Inventors: Masaharu Shimakawa, Kawasaki (JP);
Daigoro Kanematsu, Yokohama (JP);
Mitsutoshi Nagamura, Tokyo (JP);
Tomomi Furuichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1025 days.

(21) Appl. No.: 11/689,972

(22) Filed: Mar. 22, 2007

(65) Prior Publication Data

US 2007/0229563 A1 Oct. 4, 2007

(30) Foreign Application Priority Data

Mar. 31, 2006 (JP) .................................. 2006-099811
Mar. 6, 2007 (JP) .................................. 2007-056168

(51) Int. Cl.
*B41J 29/38* (2006.01)
(52) U.S. Cl. .......................... 358/1.9; 358/3.14; 347/14
(58) Field of Classification Search .................... 358/1.9, 358/2.1, 3.08, 3.14; 347/14
See application file for complete search history.

(56) References Cited

U.S. PATENT DOCUMENTS

| | | | | |
|---|---|---|---|---|
| 5,331,442 A * | 7/1994 | Sorimachi | ...................... | 358/532 |
| 5,355,421 A * | 10/1994 | Koyama | ........................ | 382/266 |
| 5,539,843 A * | 7/1996 | Murakami et al. | ............ | 382/270 |
| 5,828,396 A * | 10/1998 | Seto et al. | ...................... | 347/111 |
| 6,084,604 A * | 7/2000 | Moriyama et al. | ............... | 347/15 |
| 6,868,180 B2 * | 3/2005 | Akahori et al. | ................ | 382/167 |
| 7,085,013 B2 * | 8/2006 | Yamakawa | ...................... | 358/2.1 |
| 7,099,045 B2 * | 8/2006 | Nabeshima | ...................... | 358/2.1 |
| 7,164,504 B1 * | 1/2007 | Yamazaki | ..................... | 358/3.08 |
| 2001/0021035 A1 * | 9/2001 | Takashimizu | .................. | 358/1.9 |
| 2007/0126766 A1 | 6/2007 | Shimakawa | ..................... | 347/15 |

FOREIGN PATENT DOCUMENTS

| | | |
|---|---|---|
| EP | 11-10738 | 6/2001 |
| JP | A55-065269 | 5/1980 |
| JP | A6-135015 | 5/1994 |
| JP | A9-025442 | 1/1997 |
| JP | 2007-164644 | 6/2007 |
| WO | WO 2005-0043007 | 5/2005 |

OTHER PUBLICATIONS

European Search Report dated Dec. 29, 2009 in EP 07105040.5-2210.

* cited by examiner

*Primary Examiner* — King Poon
*Assistant Examiner* — Allen H Nguyen
(74) *Attorney, Agent, or Firm* — Fitzpatrick, Cella, Harper & Scinto

(57) ABSTRACT

An ink jet printing apparatus which inhibits possible bleeding by thinning color data adjacent to black data and enables printing free from image quality degradation such as gradation skip is provided. Specifically, when only one pixel has color data and pixels located vertically and horizontally adjacent to that pixel have no color data, an isolated point pixel containing a color dot is detected only in that pixel. Then, the dots other than the isolated point are thinned-out. This makes it possible to inhibit possible bleeding at the boundary between a color area and a black area and to achieve proper printing with the appropriate gradation of the entire image maintained.

12 Claims, 19 Drawing Sheets

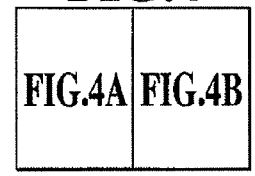
FIG.4
FIG.4A
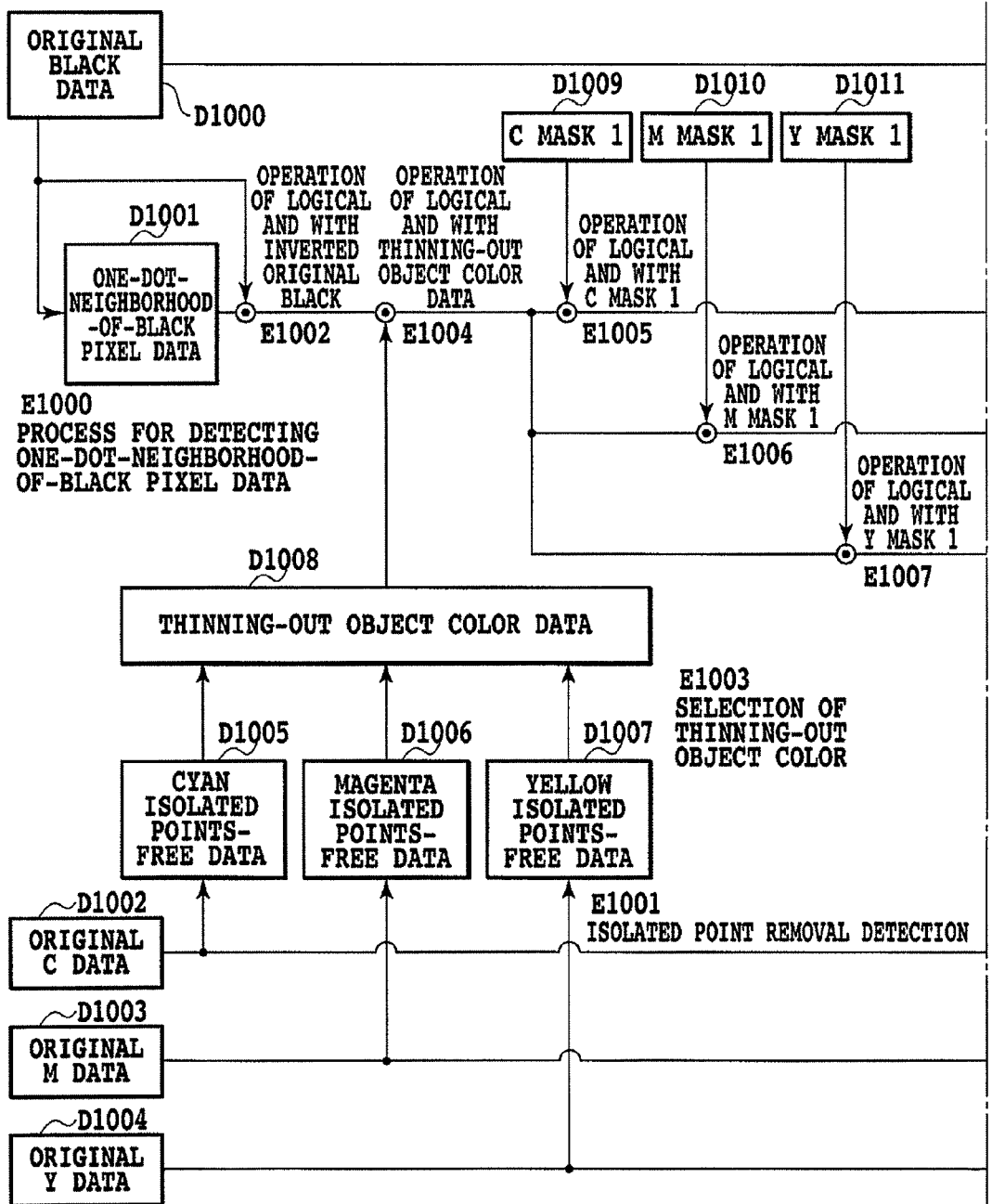

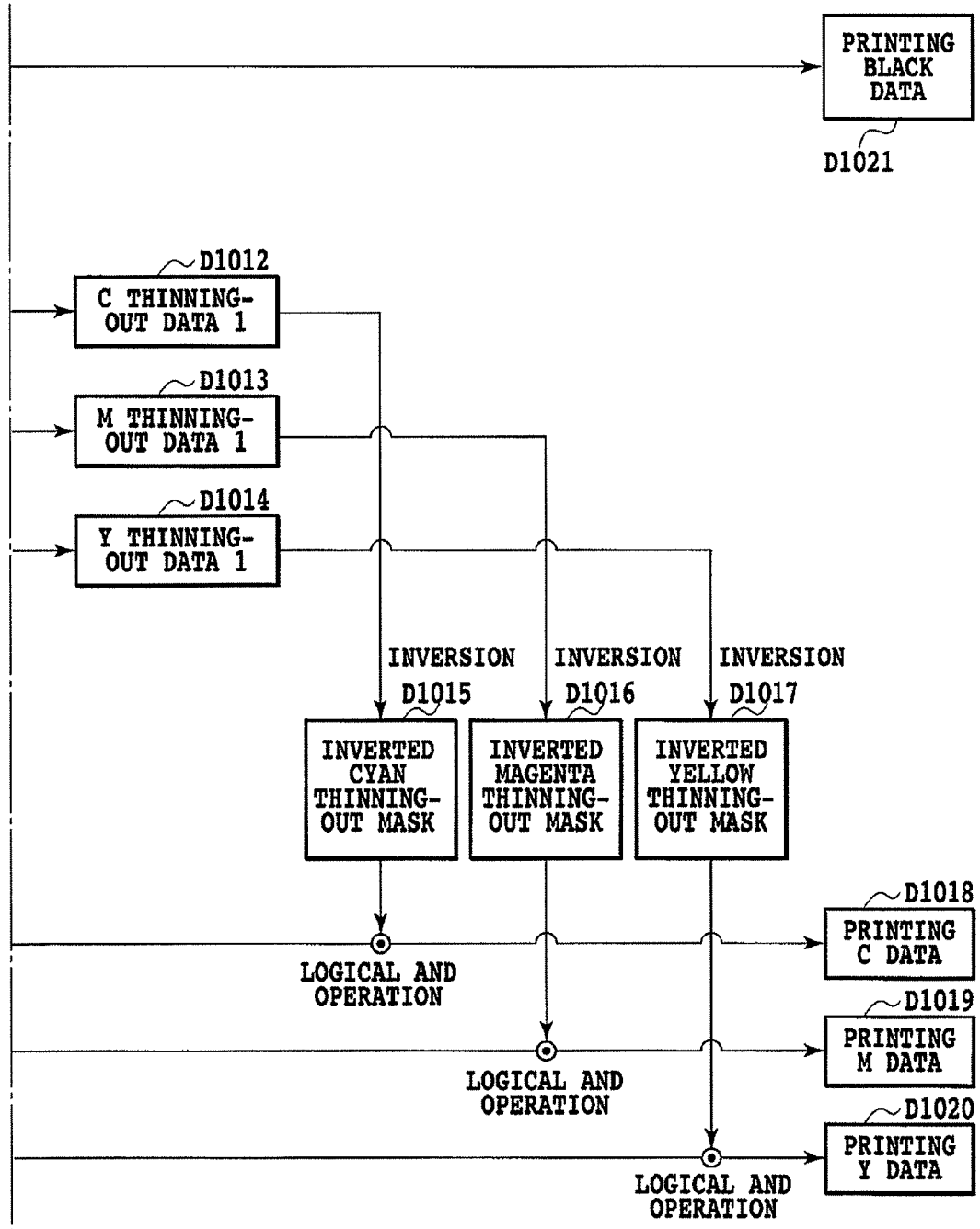

DETERMINATION OF
ONE-DOT-NEIGHBORHOOD-OF-BLACK
PIXEL AREA

ONE-DOT-NEIGHBORHOOD-
OF-BLACK PIXEL IMAGE:D1001

LOGICAL AND OF
ONE-DOT-NEIGHBORHOOD-OF-BLACK
PIXEL DATA AND INVERTED
ORIGINAL BLACK DATA

ONE-DOT-NEIGHBORHOOD-OF-BLACK
THINNING-OUT OBJECT IMAGE

DETERMINATION OF SOLID AREA

DETERMINATION OF SOLID AREA

DETERMINATION OF SOLID AREA

ORIGINAL COLOR IMAGE

ONE-DOT-NEIGHBORHOOD-OF-BLACK THINNING-OUT OBJECT IMAGE

THINNING-OUT OBJECT COLOR IMAGE:D1008

ONE-DOT-NEIGHBORHOOD-OF-BLACK THINNING-OUT OBJECT COLOR IMAGE

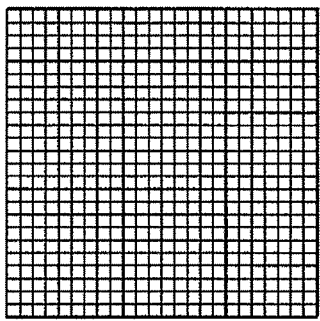
FIG.17A CYAN THINNING-OUT DATA 1: D1012
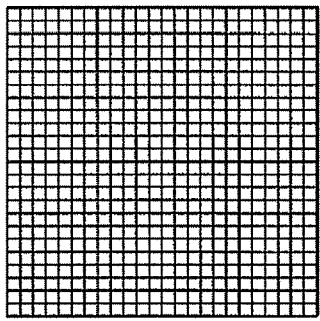
FIG.17B MAGENTA THINNING-OUT DATA 1: D1013
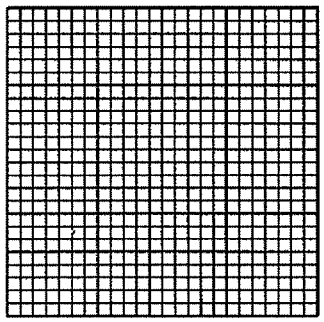
FIG.17C YELLOW THINNING-OUT DATA 1: D1014
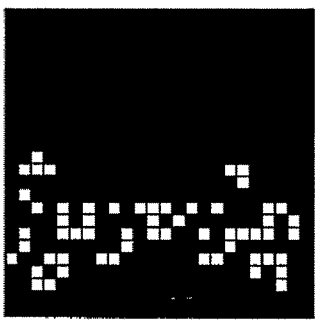
FIG.17D INVERTED CYAN THINNING-OUT MASK: D1015
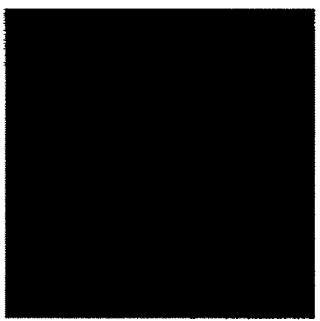
FIG.17E INVERTED MAGENTA THINNING-OUT MASK: D1016
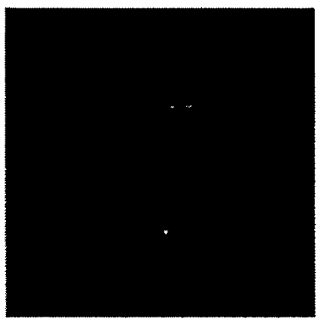
FIG.17F INVERTED YELLOW THINNING-OUT MASK: D1017

PRINTING YELLOW DATA :D1020

PRINTING MAGENTA DATA :D1019

PRINTING CYAN DATA :D1018

PRINTING DATA

ORIGINAL IMAGE DATA

INK JET PRINTING APPARATUS, IMAGE PROCESSING APPARATUS, AND METHOD FOR PROCESSING IMAGE

BACKGROUND OF THE INVENTION

1. Field of the Invention

The present invention relates to ink jet printing apparatuses, image processing apparatuses, and methods for processing an image, and more specifically, to a process for, when carrying out printing using a black ink and color inks, thinning color ink dots adjacent to a black ink dot.

2. Description of the Related Art

Ink jet printing apparatuses, which eject ink to a print medium for printing, can execute high density and high speed printing on various print media. The ink jet printing method has many advantages, for example, low running costs and reduced noise involved in a printing operation. The ink jet printing apparatus has thus been widely used and commercialized as various image output apparatuses such as printers and portable printers.

A known printing method for the ink jet printing apparatus is what is called a serial method according to which a carriage carrying print heads and ink tanks is scanned over a print medium, while inks are ejected to the print medium to print the corresponding area. This method conveys the print medium in a direction substantially orthogonal to a scan direction by a predetermined amount during the period between scans. The scan operation and the operation of conveying the print medium are repeated to print the entire print medium. Another known printing method is what is called a full line method. This method uses a print head having ejection openings arranged within the range corresponding to the width of the print medium and conveys the print medium with respect to the print head for printing.

In recent years, the ink jet printing apparatus, having various advantages such as those described above, has been provided as various products that use a plurality of colors of inks to execute color printing. In general, the color ink jet printing apparatus often uses the black ink to print characters or the like. This results in the need for a black ink that enables sharp, clear, and high optical density print characters to be printed. Some known techniques use a black ink exhibiting a reduced permeability to the print medium to inhibit a coloring material such as a dye or pigment in the black ink from permeating the print medium. This increases the amount of the coloring material remaining and fixed on the print medium to provide sharp and high density print images.

For the color inks, when inks in different colors are applied to the respective adjacent areas on the print medium, a phenomenon (breeding) may occur in which these inks mix at the boundary between the areas to degrade the quality of the resulting color image. To prevent this, known techniques use inks with an increased permeability to a print medium (see, for example, Japanese Patent Laid-open No. 55-065269 (1980)). This makes it possible to prevent much of the inks applied to the respective areas from permeating the print medium and spreading across the boundary to mix together.

However, the above combination of the black ink and color ink raises the following problem. In an image having a black area and a color area which are adjacent to each other, the black ink, having a lower permeability, may spread across the boundary between the areas to mix with the color ink instead of permeating the print medium quickly. That is, bleeding may occur at the boundary between the black and color areas.

To deal with this problem, several conventional measures have been proposed.

A first measure is to provide fixing means such as a heat fixing device. This enables the ink to be quickly fixed to the print medium to prevent possible bleeding. This also makes it possible to prevent the image from being smeared with ink not having been fixed.

A second measure is to apply the color ink, having a higher permeability, to the same area to which the black ink is to be applied. The black ink is thus applied to the sheet surface wetted with the color ink. This facilitates the permeation of the black ink through the print medium to prevent possible bleeding at the boundary between the black area and the color area. Further, the fixation is also promoted to enable the inhibition of possible smear. An image printed with the black ink is subject to smear in some areas and to boundary bleeding in other areas. The color ink is thus applied to the respective areas to promote the fixture. Moreover, the amount of color ink applied to inhibit possible smear is different from that of color ink applied to inhibit possible boundary bleeding. This promotes the fixture in each area to enable the inhibition of both smear and boundary bleeding.

A third measure is to use a combination of inks of the type in which the black ink and color ink react and coagulate with each other (see, for example, Japanese Patent Laid-open No. 9-025442 (1997)). This enables the inhibition of possible boundary bleeding.

However, the first measure provides the fixing means, requiring an increase in the size of the apparatus and in costs. Further, with the serial printing apparatus, the intermittent feeding (conveyance) of a print medium may make cause uneven fixing. Moreover, the fixation requires a somewhat long time, increasing the amount of time until sheet discharging. This unfortunately degrades throughput.

With the second measure, when the color ink, having a higher permeability, is applied to overlap with the black ink in order to facilitate the fixation of the black ink, the black ink may permeate the print medium at the same time when the color ink permeates the print medium. This reduces the black ink remaining on the surface of the print medium. Unfortunately, this in turn prevents the realization of a sharp and high density black image, which is the original purpose of the black ink. Moreover, in the area in which the black and color inks are adjacent to each other, when the color ink in the area adjacent to the black ink permeates the print medium, the adjacent black ink also permeates the print medium. In this case, the black ink may permeate the print medium to the area of the color ink, resulting in the bleeding of the black ink.

The third measure coagulates the black and color inks together. This disadvantageously limits the compositions of the black and color inks. For example, one of the inks needs to be cationic, while the other needs to be anionic; the available inks are limited.

A known technique different from those described above distinguishes black pixels from color pixels in an image to be printed and thins the color pixels adjacent to the black pixel (see Japanese Patent Laid-open No. 6-135015 (1994)). This makes it possible to inhibit possible boundary bleeding. This technique can inhibit possible boundary bleeding without raising any problem as in the above first to third embodiments.

However, the conventional technique for thinning data from adjacent color areas thins all of the color inks to be applied to areas adjacent to a black area. Thus, in spite of the successful inhibition of possible boundary bleeding, in an image with varying a gradation, a gradation skip in which the gradation varies relatively rapidly may occur. This may degrade image quality. More specifically, the above conventional thinning method thins color data even if a black area is present with color data present only in one pixel adjacent to the black area. This may degrades an image intended to express a specific gradation by providing such isolated color data. This may in turn result in clearly observed image quality degradation such as the gradation skip.

SUMMARY OF THE INVENTION

An object of the present invention is to provide an ink jet printing apparatus, an image processing apparatus, and a method for processing an image which can inhibit possible bleeding by thinning color data adjacent to black data and which enables high-quality printing while preventing possible image quality degradation such as gradation skip.

In the first aspect of the present invention, there is provided an ink jet printing apparatus that generates print data based on image data arranging a plurality of pixels including pixels having black data and color data and performs printing by applying black ink and color ink to a print medium, said apparatus comprising: detection means for detecting color data pixels that are not isolated point pixels, in which predetermined number of or more pixels are not consecutively arranged in a predetermined direction in the arrangement of pixels, and that are pixels located in neighborhoods of pixels having black data in the image data, in pixels having color data; and generating means for generating printing data for color by thinning-out color data of the color data pixels detected by said detection means.

In the second aspect of the present invention, there is provided an ink jet printing apparatus that generates print data based on image data arranging a plurality of pixels including pixels having black data and color data and performs printing by applying black ink and color ink to a print medium, said apparatus comprising: isolated point pixel detection means for detecting isolated point pixels, in which a predetermined number of or more pixels are not consecutively arranged in a predetermined direction in the arrangement of pixels, in pixels having color data; neighborhood-of-black pixel detection means for detecting neighborhood pixels of pixels having black data of the image data, in the pixels having color data; thinning means for thinning the color data; and generating means for generating printing data for color ink by thinning-out color data of the neighborhood pixels of pixels having black data.

In the third aspect of the present invention, there is provided an image processing apparatus that generates print data based on image data arranging a plurality of pixels including pixels having black data and color data and performs printing by applying black ink and color ink to a print medium, said apparatus comprising: detection means for detecting color data pixels that are not isolated point pixels, in which predetermined number of or more pixels are not consecutively arranged in a predetermined direction in the arrangement of pixels, and that are pixels located in neighborhoods of pixels having black data in the image data, in pixels having color data; and generating means for generating printing data for color by thinning-out color data of the color data pixels detected by said detection means.

In the fourth aspect of the present invention, there is provided An image processing method of generating print data based on image data arranging a plurality of pixels including pixels having black data and color data and performs printing by applying black ink and color ink to a print medium, said apparatus comprising: a detection step of detecting color data pixels that are not isolated point pixels, in which predetermined number of or more pixels are not consecutively arranged in a predetermined direction in the arrangement of pixels, and that are pixels located in neighborhoods of pixels having black data in the image data, in pixels having color data; and a generating step of generating printing data for color by thinning-out color data of the color data pixels detected by said detection step.

The above configuration removes isolated point pixels from pixels in image data which are adjacent to a black data area and in which color data is present. Thinning is then executed on the color data free from the isolated points. Thus, in thinning color pixels adjacent to a black image, color data used to express a specific gradation is prevented from being thinned-out. This inhibits possible bleeding at the boundary between the black and color images and enables printing free from image quality degradation such as a gradation skip.

Further features of the present invention will become apparent from the following description of exemplary embodiments (with reference to the attached drawings).

BRIEF DESCRIPTION OF THE DRAWINGS

FIG. 4 is a diagram showing a relation between FIGS. 4A and 4B, and FIGS. 4A and 4B are block diagrams showing a process for generating print data for respective colors which process includes a thinning process in accordance with an embodiment of the present invention;

FIGS. 17A to 17K are diagrams showing data generated by the data generating process in FIG. 16.

DESCRIPTION OF THE EMBODIMENTS

Embodiments of the present invention will be described below with reference to the drawings. In the embodiments described below, an ink jet printer will be described as an example of an ink jet printing apparatus.

Outline of the Ink Jet Printer

Figure 1:
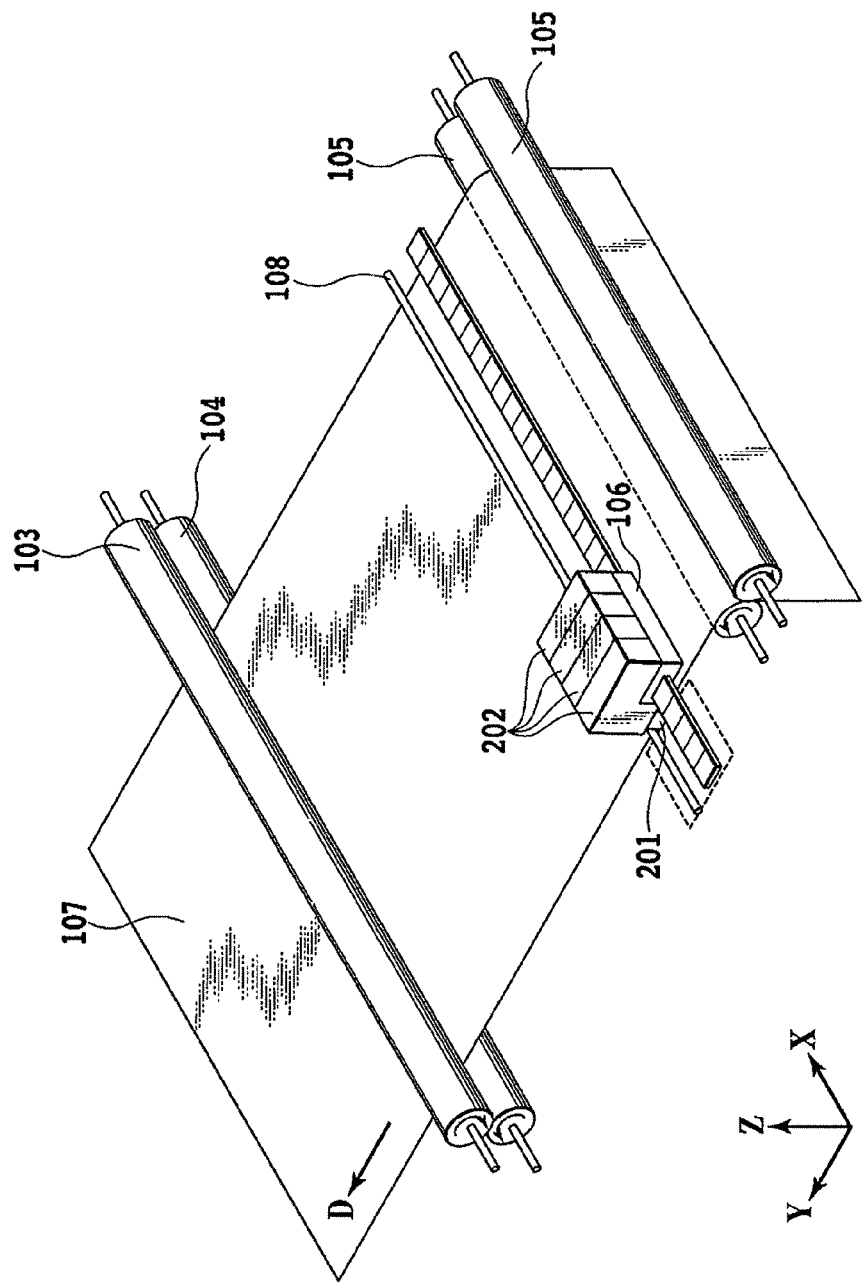
FIG. 1 is a perspective view schematically showing the configuration of a color ink jet printer in accordance with an embodiment of the present invention.

FIG. 1 is a perspective view schematically showing a color jet printer in accordance with an embodiment of the present invention. In this figure, reference numeral 202 denotes ink cartridges that store color inks in cyan, magenta, yellow and a black ink, respectively. The ink cartridges 202 are removably mounted on the carriage 106. Print heads 201 corresponding to the respective inks are also removably mounted on the carriage 106. The carriage 106 can move while being guided along a guide shaft 108 by a driving mechanism (not shown) This allows the print heads 201 to scan a print medium 107 such as a print sheet for printing. Reference numeral 104 denotes a sheet feeding roller that rotates with an auxiliary roller 103 (desirably in spur form) in the direction of an arrow in the figure. Similarly, a sheet feeding roller pair 105 is provided upstream of the print heads 201 in the direction of conveyance of the print medium 107. The sheet feeding roller pair 105 rotates in synchronism with the conveying roller 104. This allows the print medium to be conveyed in a direction shown by arrow D in the figure with a print surface of the print medium 107 kept flat.

In response to a print instruction, the carriage 106 moves in an x direction in the figure to execute scanning with the print heads. During the scanning, ejection heaters in the print heads 201 are driven to eject the corresponding inks in accordance with the print data. An area on the print medium 107 is thus printed which corresponds to the print width of the print heads. After the print scan is finished and before the next print scan is started, the sheet feeding roller 104 feeds the sheet by a distance equal to the required width in the direction of arrow D in the figure. The scanning and sheet feeding operations are thus repeated to complete printing the predetermined area in the print medium.

Instead of being executed only during the main scan in one direction, printing may also be executed during a return, that is, while the carriage is returning to its home position after the main scan printing in the x direction, in order to increase print speed. Further, in the example described above, the ink tanks and the print heads are detachably mounted on the carriage 106. However, an ink jet cartridge form may be used in which the ink cartridges 202, accommodating the respective inks, are integrated with the print heads 201. Moreover, a multi-color integrated print head may be used which can eject a plurality of color inks.

A capping mechanism (not shown) and a recovery unit (not shown) are provided within the range of movement of the carriage; the capping mechanism caps ejection opening surfaces of the print heads, and the recovery unit performs a head recovering operation of, for example, removing ink with an increased viscosity or bubbles from the print heads capped by the capping mechanism. The recovery unit has, for example, a cleaning blade (not shown) supported so that the blade can project toward the print heads 201 and abut against their front surfaces. Thus, after a recovery operation, the cleaning blade is projected into a path of movement of the print heads to wipe unwanted ink droplets, dirt, and the like off from the front surfaces of the print heads as the print heads move.

Outline of the Print Heads

Figure 2:
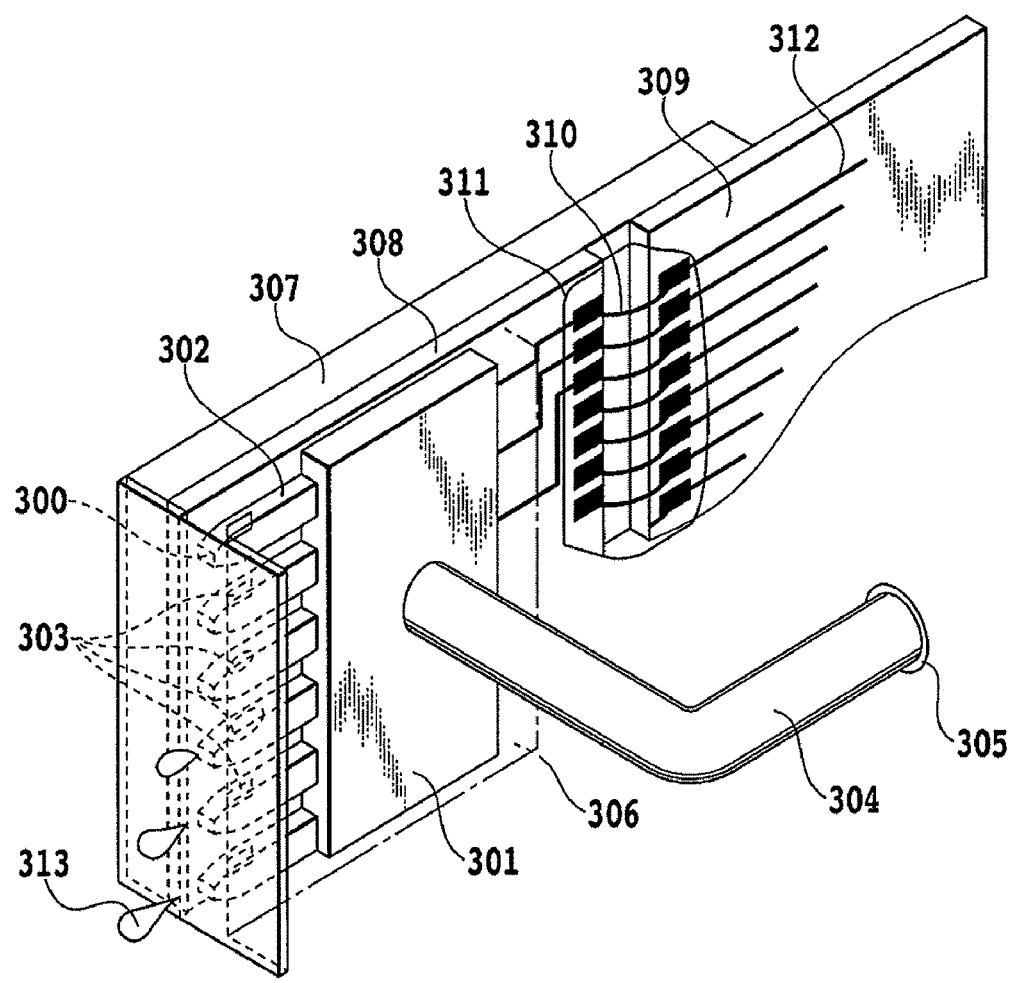
FIG. 2 is a perspective view schematically showing the configuration of an essential part of a print head 201 shown in FIG. 1.

FIG. 2 is a perspective view schematically showing the configuration of essential part of the print heads 201, shown in FIG. 1. As shown in FIG. 2, each of the print heads 201 has a plurality of ejection openings 300 formed therein at a predetermined pitch, a common liquid chamber 301, channels 302 that couple the common liquid chamber 301 to the ejection openings 300, and ejection heaters 303 each disposed along a wall surface of the corresponding channel 302 to generate ejection energy. The heaters 300 and their circuits are formed utilizing a semiconductor fabricating technique. The channels 302 and common liquid chamber 301 are formed of a plastic cover 306 created by injection molding. Temperature sensors (not shown) and sub-heaters (not shown) are also formed on the same silicon at a time during the same semiconductor fabricating process. A silicon plate 308 having these electric wires is fixed to an aluminum base plate 307 constituting a support substrate. A circuit connection portion 311 on the silicon plate 308 is electrically connected to a printed circuit board 309 through very thin wires 310. The circuit connection portion 307 and printed circuit board 309 can receive signals from the printing apparatus main body via signal circuits 312. The common liquid chamber 301 is coupled to the ink cartridge shown in FIG. 1 via a joint pipe 304 with an ink filter 305. This allows inks to be fed from the ink cartridge to the common liquid chamber 301. The fed inks are temporarily stored in the common liquid chamber and then fed to the channels 302. The inks form meniscuses at the ejection openings 300 as a result of a capillary phenomenon to keep filling the channels 302. Then, the heaters 303 are energized via electrodes (not shown) to generate heat. The inks on the heaters 303 are thus rapidly heated to generate bubbles in the channels 302. The bubbles then expand to eject ink droplets 313 from the ejection openings 300.

Outline of the Control Configuration

Figure 3:
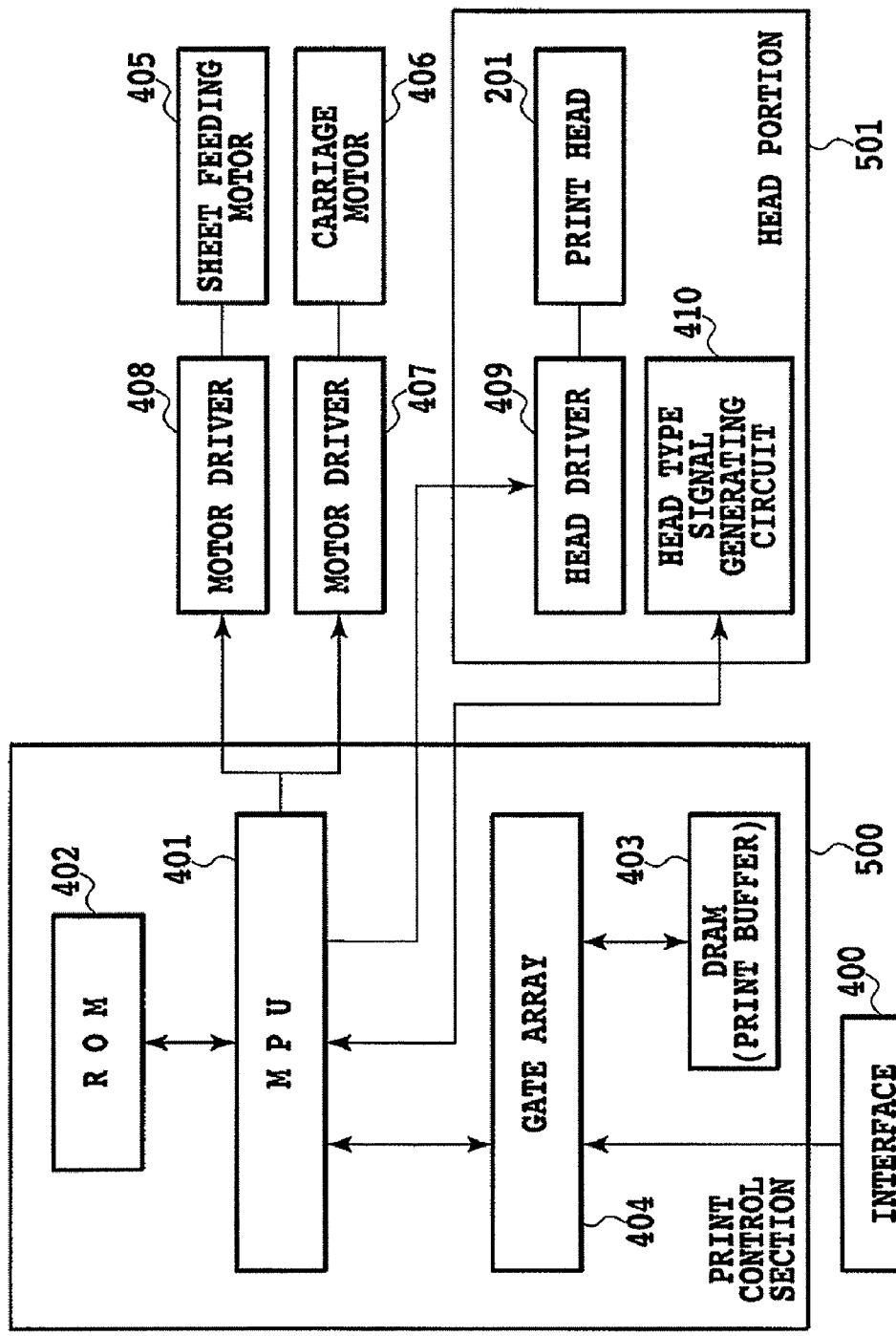
FIG. 3 is a block diagram showing a control arrangement in the color ink jet printer in accordance with an embodiment of the present invention.

FIG. 3 is a block diagram showing a control configuration in the ink jet printer in accordance with the embodiment shown in FIG. 1. In the figure, reference numeral 400 denotes an interface that inputs print data from a host apparatus such as a personal computer (PC) to the ink jet printer. A print control section 500 executes a process of thinning of print data, which is inputted via the interface, as described with reference to FIG. 4 and subsequent figures, and other processes for finally obtaining data in a form supplied to a print head portion 501. The print control section 500 controls the operation of operating mechanisms for the respective portions such as a sheet feeding motor 405 and a carriage motor 406 in association with printing operations.

An MPU 401 in the print control section 500 controls the data thinning process and printing operation in accordance with control programs stored in a program ROM 402. A RAM (DRAM) 403 is used as a work area in which the MPU 401 executes these processes. That is, the RAM 403 temporarily stores print data, ejection data supplied to the print heads, and other data. The RAM 403 also memorizes the number of print dots, the number of times the print heads have been replaced with new ones, and the like. A gate array 404 controls the supply of print data to the print heads and the transfer of data between the interface 400 and MPU 401 and DRAM 403. Motor drivers 407 and 408 drive a conveyance motor 405 and a carrier motor 406, respectively. A head driver 409 drives the print heads 201 to eject inks from the ejection openings.

(First Embodiment)

Outline of the Thinning Process

In a process in accordance with a first embodiment of the present invention, when one pixel has color data and pixels located vertically and horizontally adjacent to that pixel have no color data, the pixel having color data is defined as an "isolated point". The color data at the isolated point is not thinned-out.

Specifically, the thinning process of the present embodiment is executed in accordance with data processing shown in FIGS. 4A and 4B. Then, on the basis of the results, final print data for each color is generated. FIGS. 4A and 4B are block diagrams showing each of the series of processes and data resulting from the process.

The thinning process in accordance with the present embodiment will be described in brief with reference to FIG. 4. Isolated point removal detection (E1001) is executed to detect only consecutive dots in original print data (D1002, D1003, and D1004) for cyan, magenta, and yellow. On the basis of the detecting, isolated points-free data (D1005, D1006, and D1007) are generated. Here, the original print data is binary data composed of data "1" indicating that the ink dot is to be printed and data "0" indicating that the ink dot is not to be printed. In the present specification, the data "1" or a pixel having this data may be simply called a dot. Then, in the isolated points-free data for the respective colors, those of the colors of color data located in proximity to black data which are to be thinned-out are selected (E1003) to generate thinning-out object color data (D1008) as described later with reference to FIG. 13. That is, the thinning-out object color data has no isolated point but has a plurality of consecutive dots in vertical and horizontal pixel lines. As is apparent from the description below, the use of this data for thinning basically makes it possible to prevent the thinning of color data on colored isolated point pixels adjacent to a black image.

Figure 6A:
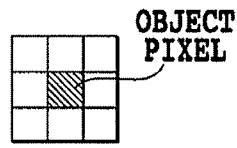
FIGS. 6A to 6D are diagrams illustrating an example of detection of one-dot-neighborhood-of-black pixels.

On the other hand, a process of detecting one-dot-neighborhood-of-black pixel data (E1000) is executed on original black data (D1000). Specifically, in the blackdata, the number of black dots present in a 3×3 matrix centered at an object pixel is counted. If at least one black dot is present, the object pixel is set to be a one-dot-neighborhood-of-black pixel. Then, an operation of logical AND (E1002) of the thus obtained one-dot-neighborhood-of-black pixel data (D1001) and the inverted data of the original black data (D1000) is executed to generate one-dot-neighborhood-of-black thinning-out object data (FIG. 6D). That is, detecting one-dot-neighborhood-of-black pixel data allows all the pixels adjacent to a black pixel to be detected as adjacent pixels. The logical AND removes the black pixel in the black data from the one-dot-neighborhood-of-black pixel data to generate the one-dot-neighborhood-of-black thinning-out object data containing only the extracted adjacent pixels located around the black pixel in the original black data.

Moreover, an operation of the logical AND (E1004) of the thinning-out object color data (D1008) and the one-dot-neighborhood-of-black thinning-out object data (image) determined as described above is executed. This makes it possible to obtain one-dot-neighborhood-of-black thinning-out object color data (FIG. 14D) in which a dot is present at a pixel located adjacent to a black pixel in any direction in the selected thinning-out object color data (D1008).

An operation of the logical ANDs (E1005, E1006, and E1007) of the one-dot-neighborhood-of-black thinning-out object color data and masks 1 for cyan, magenta and yellow (D1009, D1010, and D1011) are executed to adjust the amounts of data thinned-out for the respective colors. The logical AND gives thinning-out data for cyan, magenta and yellow (D1012, D1013, and D1014), respectively. That is, pixels to be thinned-out are determined for each of the print data on cyan, magenta, and yellow. The thinning-out data are inverted to obtain thinning masks (D1015, D1016, and D1017) for the respective colors. That is, the thinning mask data are obtained by inverting dots to be thinned-out in the thinning-out data so that these dots will not be printed. Finally, these masks are used to mask the original print data for the respective colors (D1002, D1003, and D1004) to enable the thinning of the color data in one dot neighborhood of a black pixel in each direction.

The thinning process makes it possible to prevent colored isolated dots from being thinned-out, for example, in an image area in which several black pixel dots and several color pixel dots are disposed to express a specific gradation. This enables that area to be printed without impairing the gradation of the area. Appropriate printing can thus be achieved with the gradation of the entire image maintained. Further, color dots adjacent to a black dot which are not isolated are thinned-out. This enables thinning to be executed in image areas in which thinning does not virtually affect gradation, to reduce bleeding at the boundary between the color area and the black area.

General Data Processing

The processing in FIG. 4, described above, will be described in detail.

The original black data (D1000) is used to detect one-dot-neighborhood-of-black pixels to be thinned-out (E1000). Thus, the one-dot-neighborhood-of-black pixel data (D1001) is generated.

Figure 13:
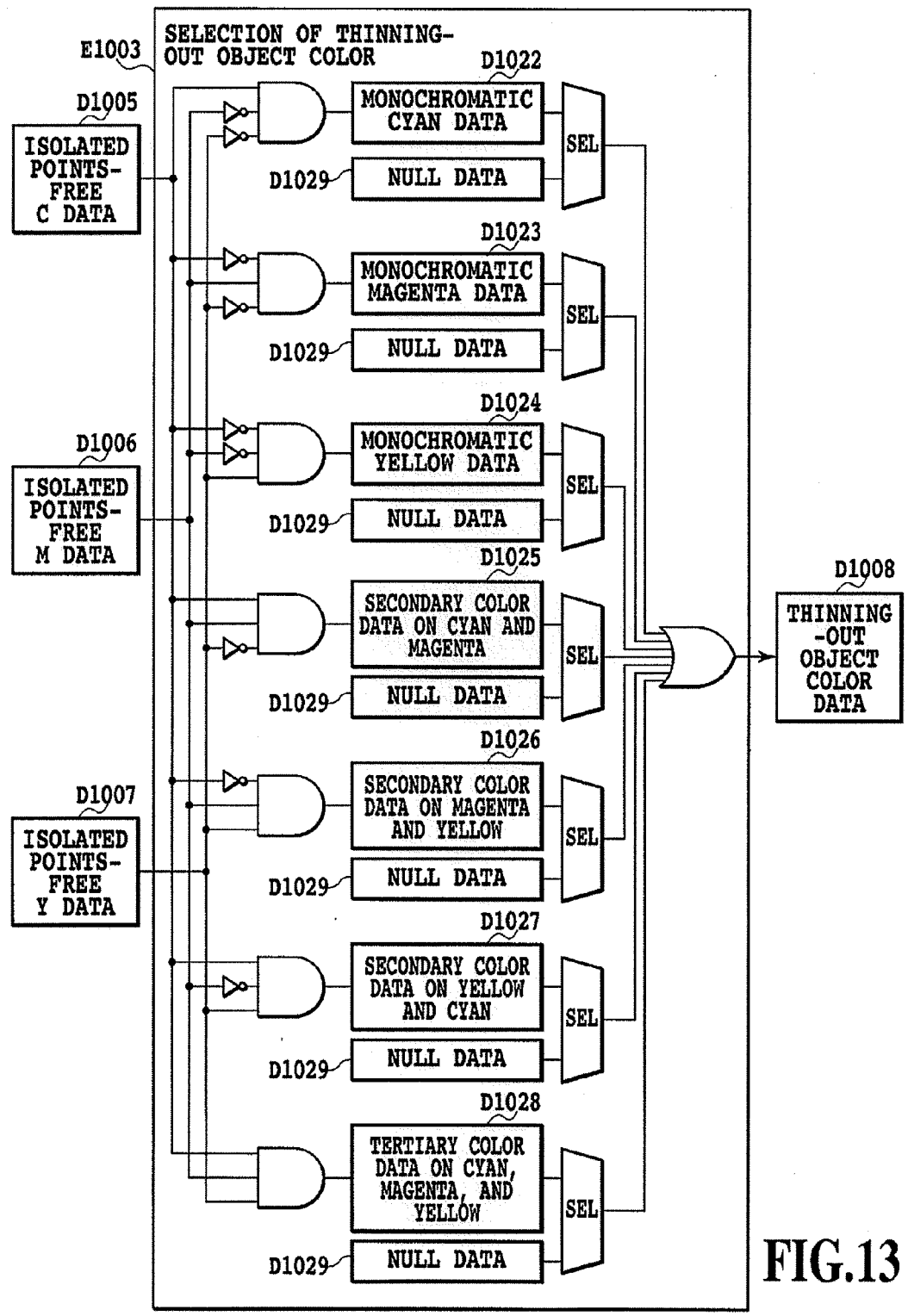
FIG. 13 is a block diagram showing the configuration of a process for selecting a thinning-out object color.

Further, the original cyan data (D1002), original magenta data (D1003), and original yellow data (D1004) are used to execute isolated point removal detection (E1001) for each color in order to remove isolated points. Thus, cyan isolated points-free data (D1005), magenta isolated points-free data (D1006), and yellow isolated points-free data (D1007) are generated. Then, to thin-out color data adjacent to black data, thinning-out object color selection (E1003) described later with reference to FIG. 13 is executed to generate thinning-out object color data (D1008).

The logical AND (E1002) of the one-dot-neighborhood-of-black pixel data thus obtained (D1001) and the inverted original black data (D1000) is calculated. Then, the logical AND (E1004) of the logical AND data obtained and the thinning-out object color data (D1008) is calculated. Then, calculation is made of the logical ANDs (E1005, E1006, and E1007) of the logical AND data and the C mask 1 (D1009), M mask 1 (D1010), and Y mask 1 (D1011), specifying the amount of data thinned-out for the respective colors. Thus, C thinning-out data 1 (D1012), M thinning-out data 1 (D1013), and Y thinning-out data 1 (D1014) are generated. The C thinning-out data 1 (D1012), M thinning-out data 1 (D1013), and Y thinning-out data 1 (D1014) are inverted to generate the inverted C thinning-out mask (D1015), the inverted M thinning-out mask (D1016), and the inverted Y thinning-out mask (D1017)

Finally, the resulting inverted thinning masks for the respective colors are used to create print data. Specifically, the logical AND of the inverted cyan thinning-out mask (D1015) and the original cyan data (D1002) is calculated to generate printing cyan data (D1018). Similarly, the logical AND of the inverted magenta thinning-out mask (D1016) and the original magenta data (D1003) is calculated to generate printing magenta data (D1019). The logical AND of the inverted yellow thinning-out mask (D1017) and the original yellow data (D1004) is calculated to generate printing yellow data (D1020). The original black data (D1000) is directly used as printing black data (D1021) without being processed.

Now, the above data processing will be described in further detail.

Generation of Thinning Data

Detection of a One-dot-neighborhood-of-black Pixel (E1000)

Figure 5:
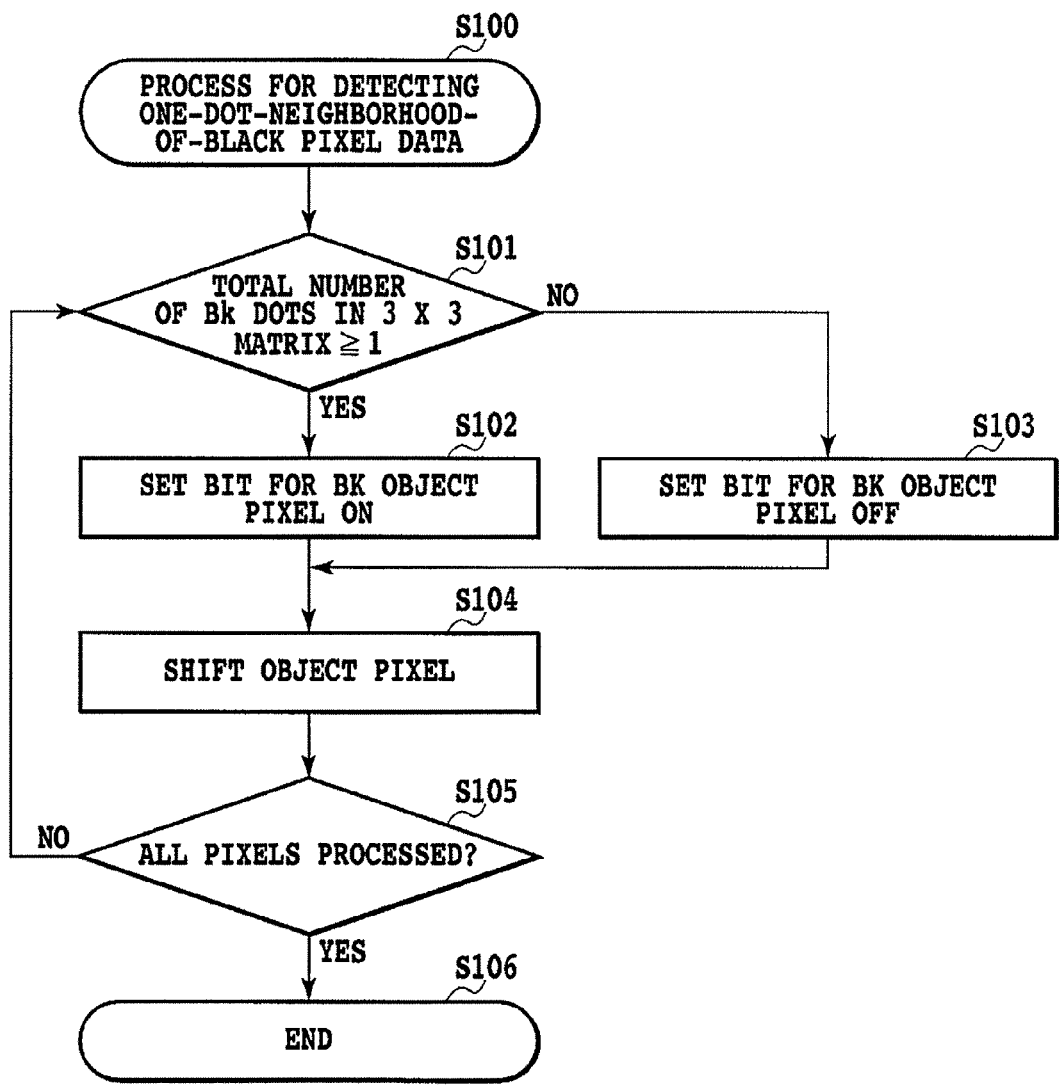
FIG. 5 is a flowchart showing a process for detecting one-dot-neighborhood-of-black pixels.

FIG. 5 is a flowchart showing a process for detecting one-dot-neighborhood-of-black pixels (E1000). FIGS. 6A to 6D are diagrams illustrating an example of detection of one-dot-neighborhood-of-black pixels.

Figure 6B:
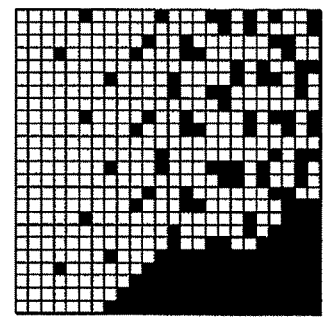
Figure 6C:
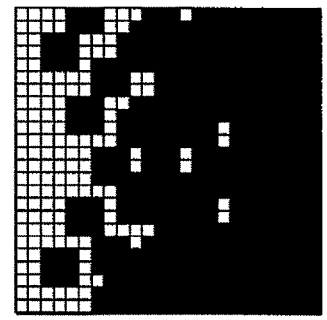
Figure 6D:
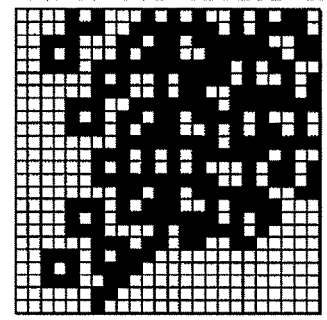

This process is executed on the original black image (D1000) shown in FIG. 6B. First, as shown in FIG. 6A, a matrix of 3×3 pixels is defined around an object pixel. The process determines whether or not the total number of black dots present in the pixels of the matrix is greater than or equal to 1 (S101). That is, if the total number of black dots is greater than or equal to 1, the bit for the object pixel is set ON (S102). That is, if at least one black dot is present in the object pixel or its adjacent pixel, the bit for the object pixel is determined to be "1". If the total number of black dots is less than 1, that is, if no black dot is present, the bit for the object pixel is set OFF (S103). Then, the object pixel is shifted by one pixel, for example, in a horizontal direction (S104). When the object pixel is located at an end of the line and cannot be shifted in the horizontal direction, the process shifts to the pixel line in the next row. Once all the object pixels are processed (S105), the process is finished. Otherwise the above process is repeated. FIG. 6C shows a dot pattern (D1001) obtained by the above process of detecting one-dot-neighborhood-of-black pixels.

An operation of the logical AND of the one-dot-neighborhood-of-black pixel data (D1001) and the inverted data of the original black image (D1000) is executed to obtain a dot pattern shown in FIG. 6D. This dot pattern includes pixels peripherally adjacent (above, below, at the right and left, and obliquely right and left above and below) to the black pixel in the original black data (D1000) and shows the thinning-out object pixels for the one dot neighborhood.

In the above example, the threshold for the total number of black dots is 1. However, the optimum value is preferably used depending on the characteristics of the inks and printing apparatus.

In the above description, the matrix of 3×3 pixels is defined so as to determine the black dot. However, the present invention is not limited to the 3×3 pixels. A matrix of L×M (L, M=1, 3, 5, ..., n, n+2, where n is a natural number) may be defined. In this case, since the number of black dots in and around the object pixel is counted, a matrix of an odd number of pixels × an odd number of pixels.

Detecting for Removal of Isolated Points in Color Data (E1001)

Figure 7:
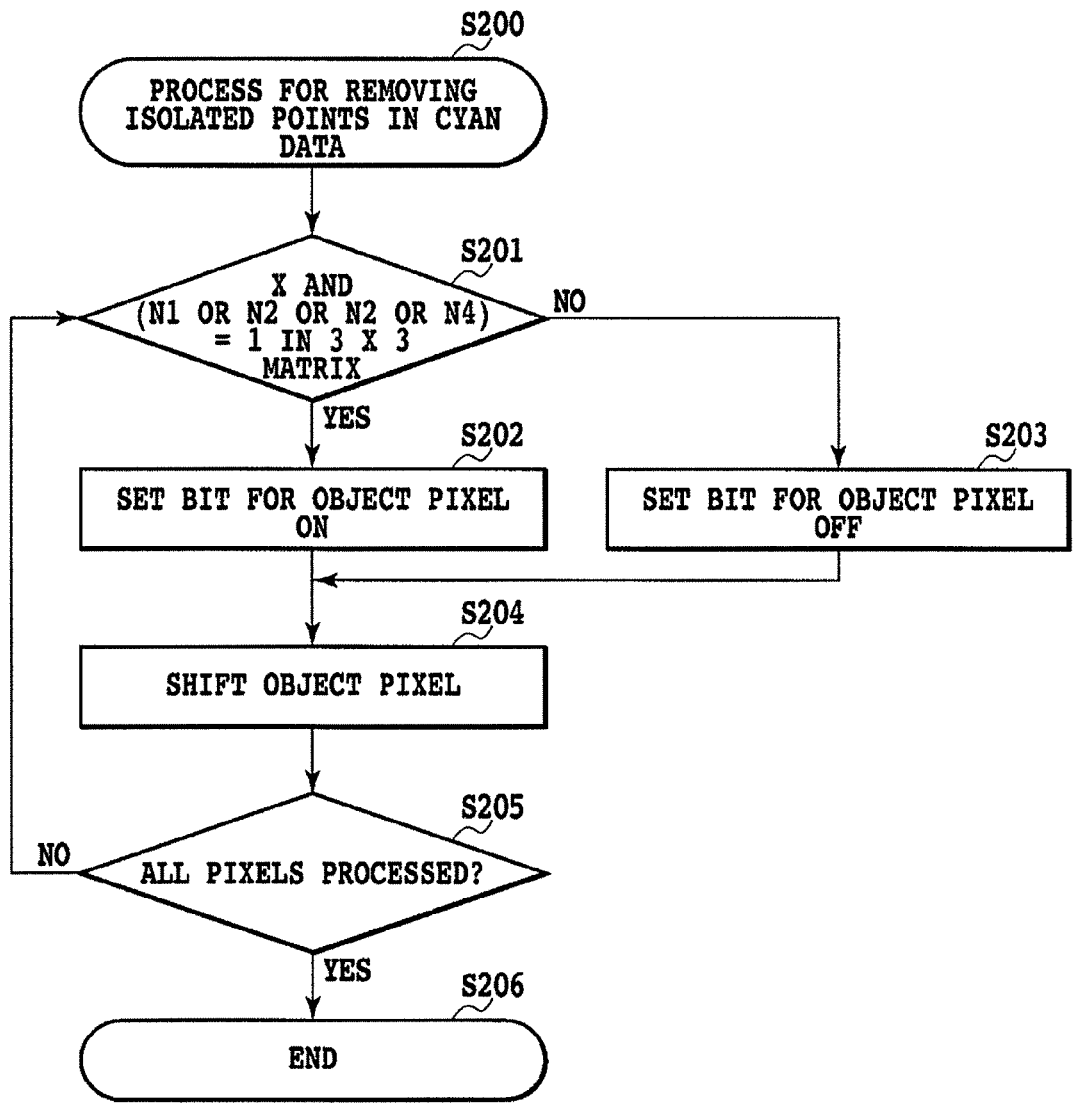
FIG. 7 is a flowchart showing an isolated point removal detection process of removing isolated points from cyan data.
Figure 8A:
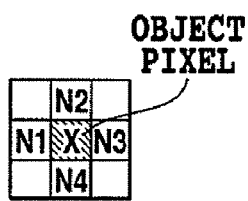
FIGS. 8A to 8C are diagrams illustrating an example of detection in sensing for removal of isolated points from cyan data.
Figure 8B:
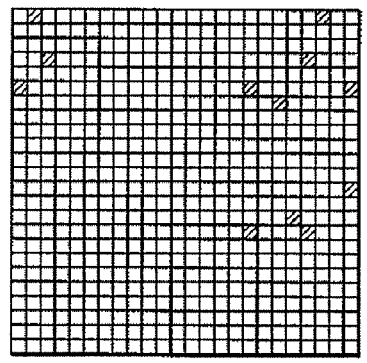
Figure 8C:
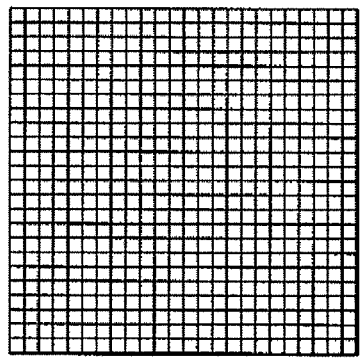

FIG. 7 is a flowchart showing an isolated point removal detection process of removing isolated points from cyan data. FIGS. 8A to 8C are diagrams illustrating a detection example in detecting for removal of isolated points from cyan data.

This process is executed on the original cyan image (D1002) shown in FIG. 8B. First, as shown in FIG. 8A, a matrix of 3×3 pixels is defined around an object pixel. The process determines whether or not the logical AND of a bit X for the object pixel in the 3×3 matrix and the logical OR of bits N1 to N4 above and below and to the right and left of the bit X, respectively, is 1 (S201). When the logical AND is 1, the bit for the object pixel is set ON (S202). Otherwise the bit in the object pixel is set OFF (S203). Thus, when a dot is present in the object pixel and another dot is present in any of the pixels above and below and to the right and left of the object pixel, the dot in the object pixel is determined not to be an isolated dot but to be a thinning-out object (thinning-out candidate).

Subsequently, the object pixel is shifted as described with reference to FIG. 5 (S204). Once all the object pixels are processed, the process is ended (S205). Otherwise the above process is repeated. With the original cyan image shown in FIG. 8B, an isolated point removing process gives a dot pattern (D1005) shown in FIG. 8C. In the original cyan image shown in FIG. 8B, all the cyan dots are isolated points. Consequently, the image shown in FIG. 8C contains none of the cyan dots. As a result, the original cyan image shown in FIG. 8B has no dot to be removed through thinning. Here, the matrix of 3×3 pixels is defined to allow isolated points to be detected. However, the present invention is not limited to the 3×3 pixels. A matrix of L×M (L, M=1, 3, 5, ..., n, n+2, where n is a natural number) may be defined to allow isolated points to be detected. In this case, since isolated points in and around the object pixel are detected, a matrix of an odd number of pixels × an odd number of pixels is preferably defined.

Magenta and yellow data are also processed as in the case of the above cyan isolated point removing process.

Figure 9:
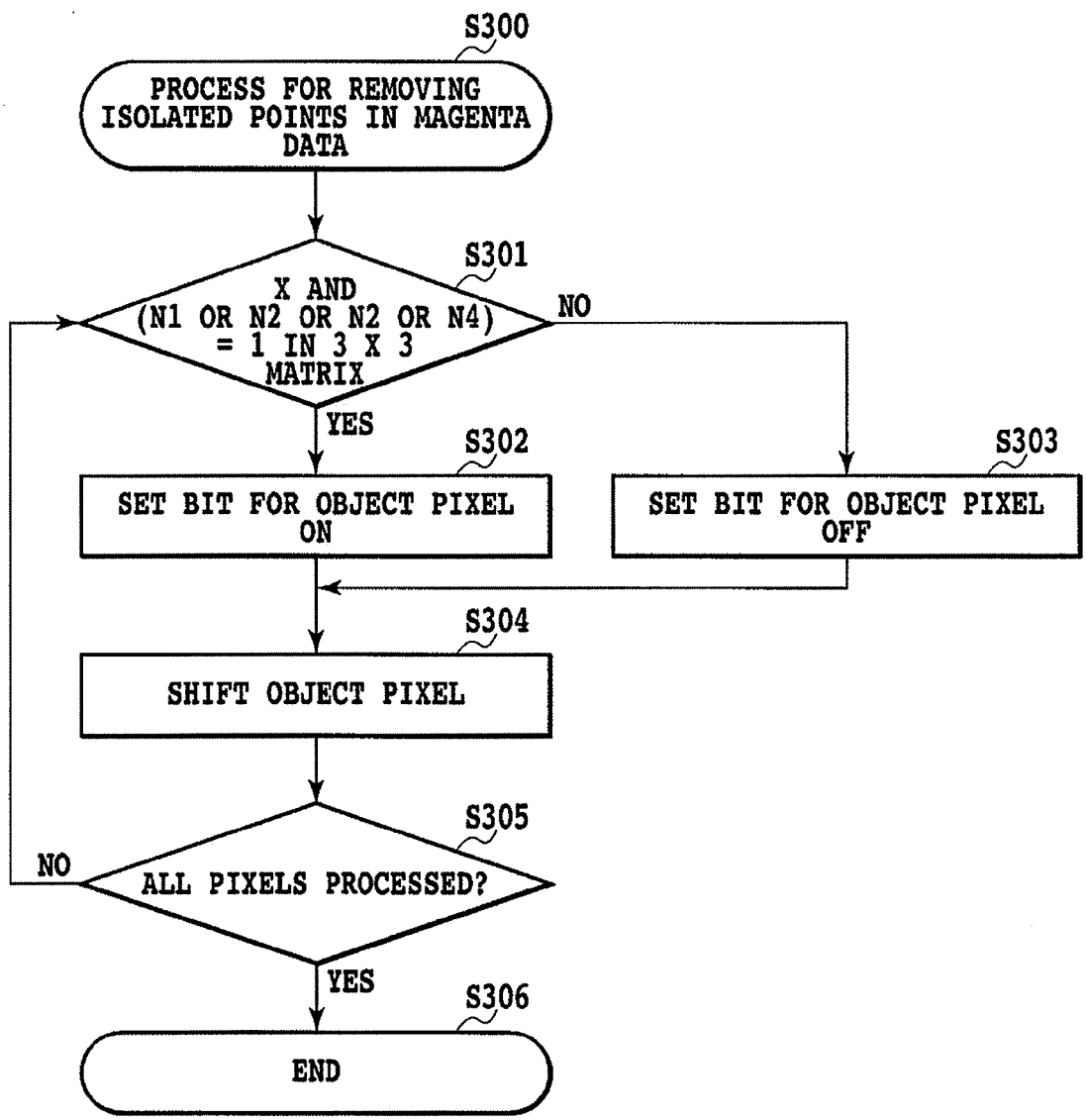
FIG. 9 is a flowchart showing an isolated point removal detection process of removing isolated points from magenta data.
Figure 10A:
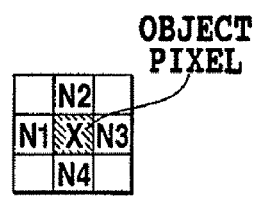
FIGS. 10A to 10C are diagrams illustrating an example of detection in sensing for removal of isolated points from magenta data.
Figure 10B:
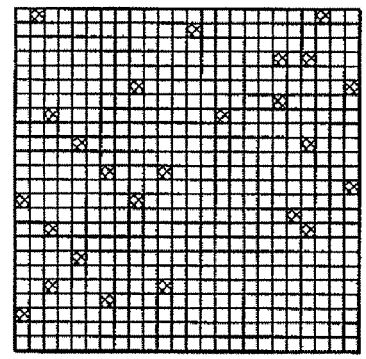
Figure 10C:
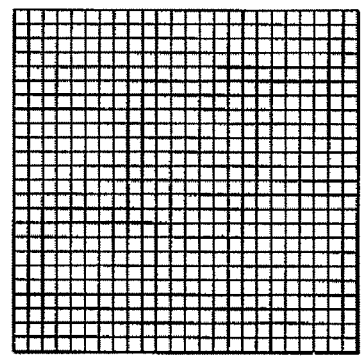
Figure 11:
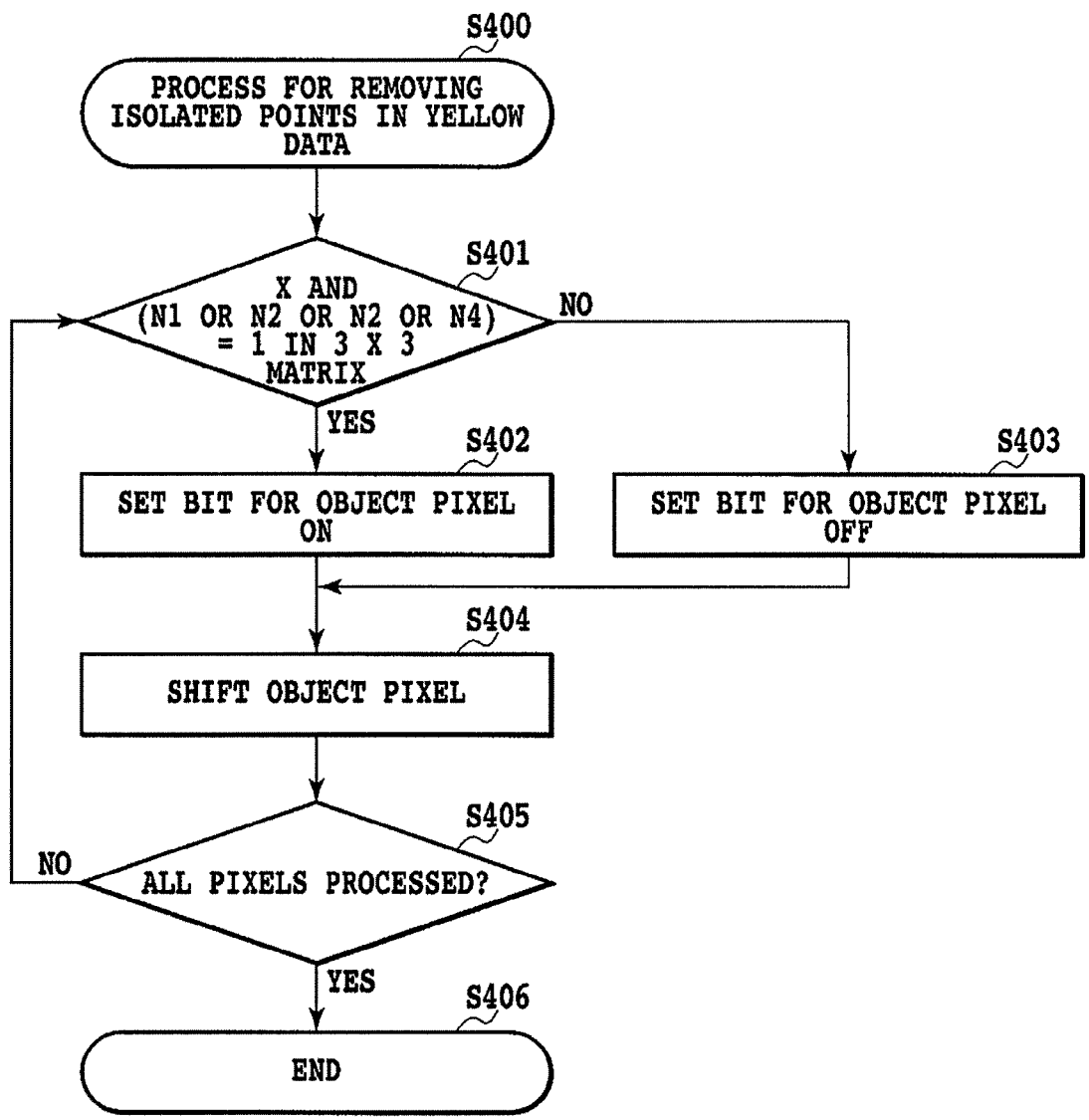
FIG. 11 is a flowchart showing an isolated point removal detection process of removing isolated points from yellow data.
Figure 12A:
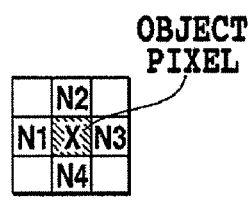
FIGS. 12A to 12C are diagrams illustrating an example of detection in sensing for removal of an isolated point from magenta data.
Figure 12B:
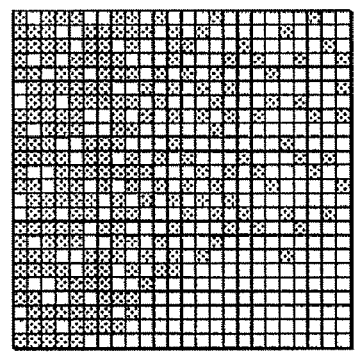
Figure 12C:
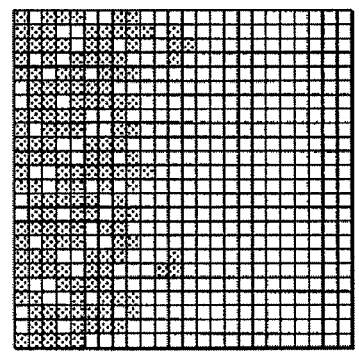

FIG. 9 is a flowchart showing an isolated point removal detection process of removing isolated points from magenta data. FIGS. 10A to 10C are diagrams illustrating an example of detection in detecting for removal of isolated points from magenta data. Further, FIG. 11 is a flowchart showing an isolated point removal detection process of removing isolated points from yellow data. FIGS. 12A to 12C are diagrams illustrating an example of detection in sensing for removal of isolated points from yellow data.

As shown in these figures, isolated point removal detection processes for magenta and yellow data are executed on the respective original images (D1003 and D1004) shown in FIGS. 10B and 12B, as is the case with cyan data. In the example shown in these figures, all the magenta dots are isolated points as shown in FIG. 10B, so that the process removes all the dots (FIG. 10C). In contrast, the example shown in FIG. 12B contains yellow dots other than isolated points, and the process leaves these dots unremoved (FIG. 12C). Thus, if the yellow image is as shown in FIG. 12B, it basically contains dots to be removed through a thinning process.

In the above isolated point removal detection, isolated points are detected on the basis of the logical AND of the object pixel and the logical OR of the pixels around the object pixel in order to simplify the process. Of course, the present invention is not limited to this configuration. For example, the process may determine whether or not any target dot is present, and if any target dot is present, the total number of dots in the pixels around the target dot may be used for the detection. The optimum value may be used as the threshold for the dot count depending on the characteristics of the inks and printing apparatus. This makes it possible to provide a general purpose system.

Selection of a Thinning-out Object Color (E1003)

FIG. 13 is a block diagram showing the configuration for a process of selecting a thinning-out object color.

As shown in the figure, the logical AND of the isolated points-free cyan data (D1005), the inverted data of the isolated points-free magenta data (D1006), and the inverted data of the isolated points-free yellow data (D1007) is calculated to generate monochromatic isolated points-free cyan data (D1022). That is, monochromatic cyan data not overlapping isolated points-free data for magenta or yellow is obtained from the isolated points-free cyan data.

Similarly, the logical AND of the inverted data of the isolated points-free cyan data (D1005), the isolated points-free magenta data (D1006), and the inverted data of the isolated points-free yellow data (D1007) is calculated to generate monochromatic isolated points-free magenta data (D1023). Also, the logical AND of the inverted data of the isolated points-free cyan data (D1005), the inverted data of the isolated points-free magenta data (D1006), and the isolated points-free yellow data (D1007) is calculated to generate monochromatic isolated points-free yellow data (D1024).

Further, the logical AND of the isolated points-free cyan data (D1005), the isolated points-free magenta data (D1006), and the inverted data of the isolated points-free yellow data (D1004) is calculated to generate isolated points-free secondary color data for cyan and magenta (D1025). The logical AND of the inverted data of the isolated points-free cyan data (D1005), the isolated points-free magenta data (D1006), and the isolated points-free yellow data (D1007) is calculated to generate isolated points-free secondary color data for magenta and yellow (D1026). The logical AND of the isolated points-free cyan data (D1005), the inverted data of the isolated points-free magenta data (D1006), and the isolated points-free yellow data (D1007) is calculated to generate isolated points-free secondary color data for yellow and cyan (D1027). That is, in the case of thinning-out secondary data on the original image, any of the secondary data generated as described above is selected.

Further, the logical AND of the isolated points-free cyan data (D1005), the isolated points-free magenta data (D1006), and the isolated points-free yellow data (D1007) is calculated to generate isolated points-free tertiary data for cyan, magenta, and yellow (D1028).

Then, selectors execute selection on the respective isolated points-free data (D1022, D1023, D1024, D1025, D1026, and D1027). That is, when selection is set, each selector outputs data on the corresponding color data. When selection is not set, the selector outputs null data (D1029; all "0" data). The logical OR of all the selected data is then calculated. This results in color data to be thinned-out.

Selecting thinning-out object color data as described above enables any of the primary, secondary, and tertiary colors to be selectively thinned-out.

FIGS. 14A to 14D are diagrams illustrating an example of selection of a thinning-out object color.

Figure 14A:
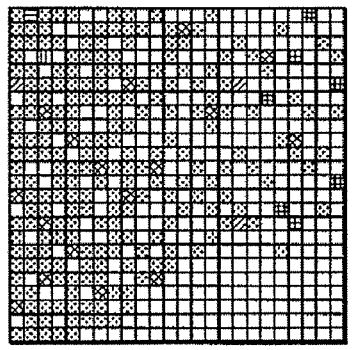
FIGS. 14A to 14D are diagrams illustrating an example of selection of a thinning-out object color.

FIG. 14A shows an original color image (an original cyan image, an original magenta image, and an original yellow image overlap one another). For example, a color which is provided adjacent to a black image in the original image (FIG. 17J) and which covers a large number of areas is selected as a thinning-out object color, with a selector set for this color, as described with reference to FIG. 13. In the example of the color original image shown in FIG. 14A, there are not so large numbers of dots of cyan and magenta, dots of green and blue as secondary colors, and dots of black as a tertiary color, which are adjacent to a black image. In contrast, a large number of yellow dots are adjacent to the black image. Accordingly, yellow is determined to be a thinning-out object color. According to an embodiment of the present invention, when the thinning-out object color is thus set, yellow isolated points used to express a specific gradation are not thinned-out. This enables printing to be executed with the appropriate gradation maintained. Images free from bleeding at the boundary between the black and color areas are obtained by varying the selected thinning-out object color depending on the ink characteristics, print resolution, or color separation characteristic. Consequently, the thinning-out object color may be preliminary determined. Further, the thinning-out object color may be varied depending on print mode in order to obtain more optimum images.

Figure 14C:
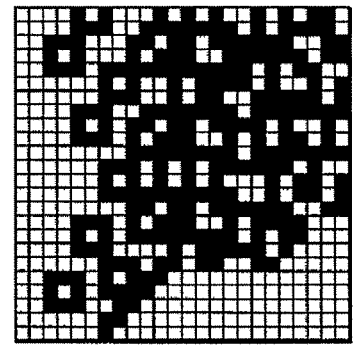
Figure 14B:
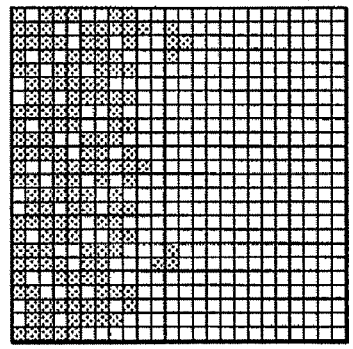

FIG. 14B shows a yellow image (D1008) selected by a thinning-out object color selecting operation (E1003). The logical AND of this dot pattern and a one-dot-neighborhood-of-black thinning-out object image shown in FIG. 14C is calculated to obtain a one-dot-neighborhood-of-black thinning-out object color image shown in FIG. 14D. That is, the one-dot-neighborhood-of-black thinning-out object color image shows thinning-out object dots that are respective one dots adjacent to black dots. As is apparent from FIG. 14D, the above logical AND allows the detection of only the boundary areas each of one dot adjacent to the black image which dot is included in the thinning-out object color dots. As described below, thinning the color dots in the boundary areas makes it possible to prevent possible bleeding at the image boundary.

Figure 14D:
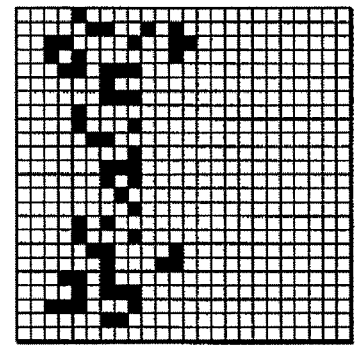

Generation of Color Thinning Masks 1 (D1009, D1010, and D1011) that Thins One-dot-neighborhood-of-black Dots FIGS. 15A to 15G are diagrams illustrating a process executed using color masks 1 (D1009, D1010, and D1011) that determine the amount of each thinning-out object color data to be thinned-out, the thinning-out object color data being shown in FIG. 14D.

Figure 15A:
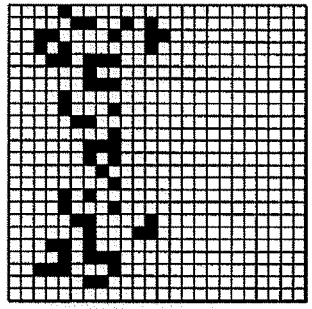
FIGS. 15A to 15G are diagrams illustrating a process for determining the amounts of thinning-out object color data shown in FIG. 14D using respective color masks 1.
Figure 15B:
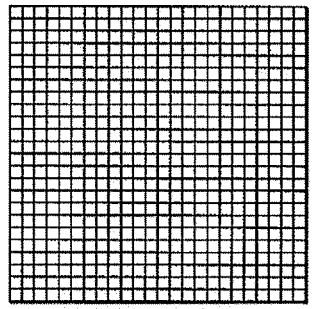
Figure 15E:
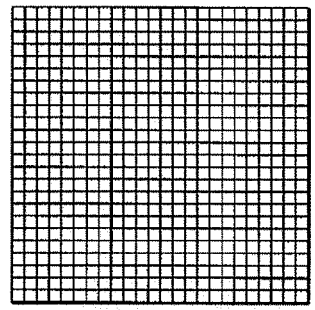
Figure 15C:
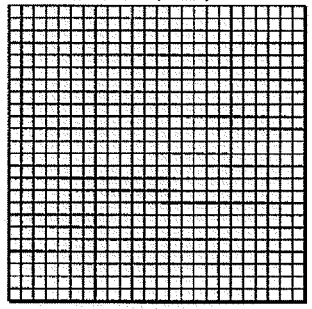
Figure 15F:
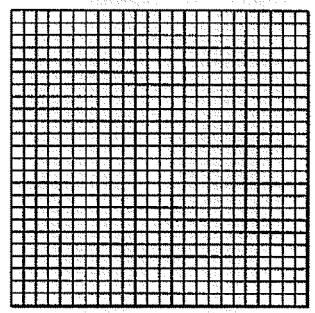
Figure 15D:
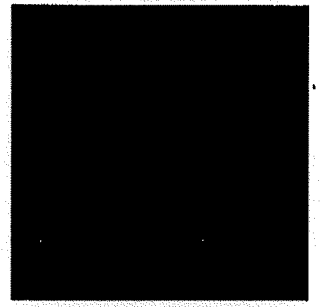
Figure 15G:
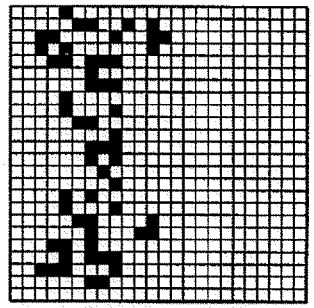

FIGS. 15B to 15D show color masks 1 for cyan, magenta, and yellow which have respective dot patterns corresponding to the amounts of color data to be thinned-out. In the example shown in these figures, the thinning amount is 0% for cyan, 0% for magenta, and 100% for yellow. The logical ANDs of the one-dot-neighborhood-of-black thinning-out object color image shown in FIG. 15A (the same as that shown in FIG. 14D) and the respective color masks 1 are calculated. This results in thinning-out data for the respective colors (D1012, D1013, and D1014) shown in FIGS. 15E to 15G.

The thinning amounts and mask sizes for the respective colors preferably have proper values depending on the characteristics of the inks and printing apparatus. The arrangement the dots in each mask may be regular or falsely random.

Generation of Printing Color Data

Figure 16:
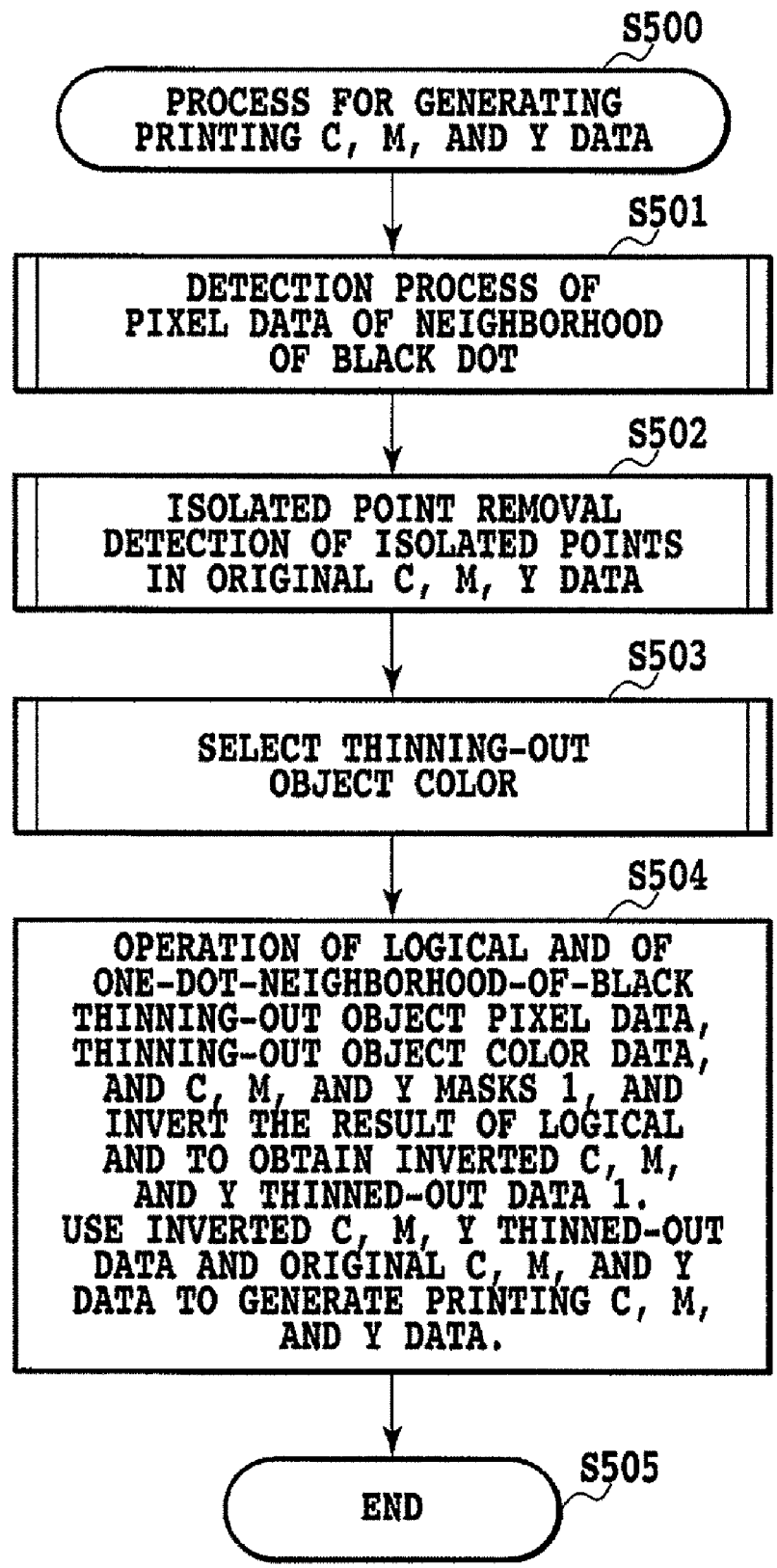
FIG. 16 is a flowchart showing a process for processing mostly printing color data.

FIG. 16 is a flowchart showing a process for generating mostly printing color data. FIGS. 17A to 17K are diagrams showing data generated by the data generating process.

The print data generating process starts with detection of pixel data of neighborhood of black dot as described above (S501). Then, also as described above, isolated point removal detection is executed on each original color data (S502), and a thinning-out object color is selected (S503).

The logical ANDs of the resulting one-dot-neighborhood-of-black thinning-out object color data and the cyan, magenta, and yellow masks 1 are calculated to generate cyan, magenta, and yellow thinning-out data 1 shown in FIGS. 17A to 17C. The cyan, magenta, and yellow thinning-out data 1 are then inverted to generate an inverted cyan thinning mask, an inverted magenta thinning mask, and an inverted yellow thinning mask (FIGS. 17D to 17F). Finally, the logical ANDs of these inverted color thinning masks and the original cyan, magenta, and yellow data are calculated to generate printing cyan, magenta, and yellow data (S504).

Figure 17I:
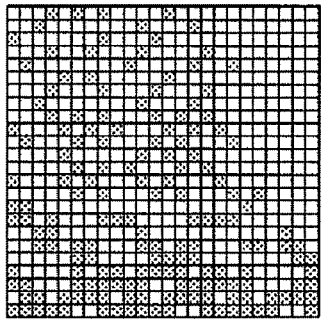
Figure 17H:
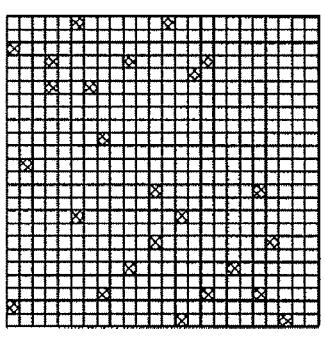
Figure 17G:
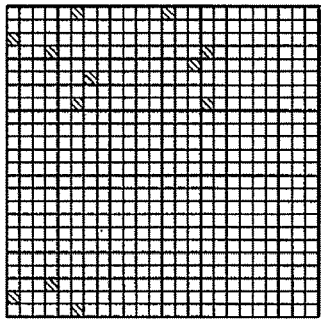
Figure 17K:
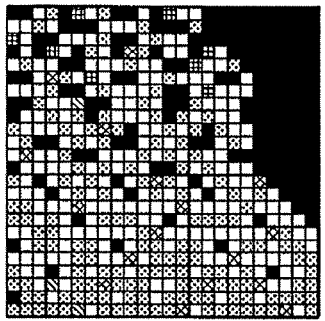
Figure 17J:
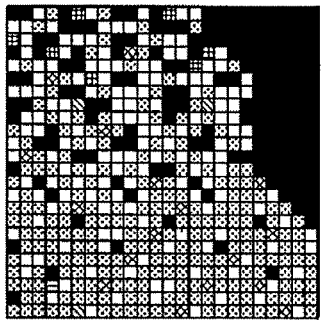

The above printing data generating process converts the original print data shown in FIG. 17J into the printing data shown in FIG. 17K. A comparison of these data indicates that in the printing data, consecutive dots in the thinning-out object color data located in proximity to the black data are thinned-out. Thus, the present embodiment thins only the consecutive thinning-out object color data instead of isolated thinning-out object color data. This enables natural thinning without gradation degradation such as gradation skip. This in turn makes it possible to inhibit possible bleeding at the boundary between the black and color areas. Further, even with an image with a hue-varying gradation, thinning can be achieved with a variation in gradation made unnoticeable.

In the present embodiment, the matrix size for isolated point sensing is 3×3. However, the proper size is preferably selected depending on the characteristics of the inks and the configuration of the printing apparatus.

(Other Embodiments)

In the above embodiments, when one pixel has color data and pixels located vertically and horizontally adjacent to that pixel have no color data, the pixel having color data is defined as an isolated point. However, the application of the present invention is not limited to this. Pixels at isolated points excluded from thinning may be, for example, two consecutive pixels to which pixels having no color data are peripherally adjacent. Alternatively, the pixel corresponding to the isolated point may be such that not only pixels located vertically and horizontally adjacent to the pixel but also pixels located obliquely right and left above and below the pixel have no color data. That is, the isolated pixel is defined to be a color pixel which is used with a black pixel to express a specific gradation and which may affect the gradation of the corresponding area when thinned-out, wherein the number of isolated pixels consecutively arranged in a predetermined direction of the pixel arrangement is equal to or smaller than a predetermined value. Briefly, in case of forming an image by thinning color pixels, the color pixels of size (area) that affects density of the formed image are defined as the isolated point. These isolated point pixels may be excluded from thinning. In the above first embodiment, the predetermined direction is the vertical or horizontal direction, and the predetermined value is 2. The number of isolated point pixels is 1. However, a plurality of consecutive isolated pixels may be provided as described above.

An example of defining consecutive plural pixels as the isolated point may be that pixels in which four or more pixels are not consecutively arranged are defined as the isolated point. In this case, if an object pixel of one pixel is present and respective two pixels located vertically and horizontally adjacent to that object pixel are present, these consecutive pixels including the object pixel may be defined as isolated point pixels. On the other hand, if respective three or more pixels located vertically and horizontally adjacent to the object pixel are present, these pixels including the object pixel are determined not to be the isolated point pixels and are thinning-out object color data. Thus, in the case of defining an area containing consecutive plural pixels as an isolated point pixel, consecutive pixels in which four or more pixels are not consecutively arranged in an only predetermined direction (for example, horizontal direction) are defined as the isolated point pixels. Also, consecutive pixels in which four or more pixels are not consecutively arranged in a plural directions (horizontal and vertical directions) may be defined as the isolated point pixels (for example, an object pixel and respective pixels located above and left of the object pixel are present).

Further, a size of the isolated point pixels which visually affect density of a printed image varies depending on ink colors. Therefore, a threshold (size of area of pixels) on which determination as to whether pixels are the isolated point pixels or not is made based may be different depending on the ink colors.

As another embodiment, in the case of defining the area containing plural pixels as the isolated point pixels, a small area (pixels) as the area gives no influence on gradation of a color area is visually unnoticeable regardless of whether color ink is ejected or not, and therefore may be thinning-out object data. For example, consecutive pixels in which two or more pixels are not consecutively arranged (that is, only one pixel) and consecutive pixels in which four or more pixels are consecutively arranged and which are not the isolated point pixels may be the object of thinning-out, and consecutive pixels in which four or more pixels are not consecutively arranged may be not the object of thinning-out. Thus, a thinning process can be executed in accordance with consecutiveness of color pixels.

In the above embodiments, one pixel adjacent to a black pixel in each direction is thinned-out. However, the present invention is not limited to this example. For example, two pixels adjacent to a black pixel in each direction may be thinned-out depending on the specifications of the printing apparatus such as the properties of the inks as well as the properties of print media for printing.

Further, in the above described embodiment, logical AND operation of a result of detection of color data pixels located in neighborhoods of black data pixels and color data pixels which have been subjected to a process that detects isolated point pixels and remove that pixels is executed to generate thinning-out object color data. The present invention is not limited to this example. For example, color data which have been subjected to a process that detects isolated point pixels and remove the isolated point pixels is generated. Then, for the color data, detection of color data which is located in neighborhoods of black data pixels is executed to generate the thinning-out object color data. Alternately, color data which is located in neighborhoods of black data pixels is extracted. Then, for the extracted color data, detection of pixels that are not isolated point pixels is executed to generate the thinning-out object color data.

The above embodiments execute a printing data generating process involving thinning in the ink jet printing apparatus. However, all or a part of the process may executed by an information processing apparatus constituting a host apparatus for the printing apparatus, for example, a personal computer.

(Further Embodiments)

The present invention is put into practice by executing program codes of software such as those shown in FIGS. 5, 7, 9, 11, and 16, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-099811, filed Mar. 31, 2006 and 2007-056168, filed Mar. 6, 2007, which are hereby incorporated by reference herein in their entirety.

What is claimed is:

1. An image processing apparatus that processes first color data including data specifying pixels to be printed with color ink and first black data including data specifying pixels to be printed with black ink, the apparatus comprising:
   first generating means for generating second color data by removing data that specifies isolated pixels to be printed with color ink, in which a predetermined number of pixels are not consecutively arranged in a predetermined direction, from the first color data;
   second generating means for generating third color data by thinning-out data that specifies neighborhood pixels located in neighborhoods of the pixels to be printed with black ink in the second color data, based on the first black data; and
   third generating means for generating fourth color data based on the third color data and the first color data.

2. The image processing apparatus as claimed in claim 1, wherein the first generating means includes first detection means for detecting non-isolated pixels by executing a logical product of data, which is obtained by executing a logical sum of data of adjacent pixels located above and below and to right and left of an object pixel, and data of the object pixel.

3. The image processing apparatus as claimed in claim 1, wherein
   the second generating means includes second detection means for detecting the neighborhood pixel in the second color data, and
   the second detection means detects an object pixel as the neighborhood pixel if a number of pixels to be printed with black ink which exist in a matrix of L×M (L, M=1, 3, 5, . . . , 2n−1, wherein n is natural number) containing an object pixel as a center pixel is greater than a predetermined number.

4. The image processing apparatus as claimed in claim 1, wherein the second generating means thins-out data that specifies neighborhood pixels located in neighborhoods of the pixels to be printed with black ink in the second color data, by using a mask.

5. The image processing apparatus as claimed in claim 1, wherein the third generating means generates the fourth data by executing logical product of the third color data and data obtained by inverting the first black data.

6. The image processing apparatus as claimed in claim 1, wherein the color ink includes cyan ink, magenta ink, and yellow ink.

7. An image processing method of processing first color data including data specifying pixels to be printed with color ink and first black data including data specifying pixels to be printed with black ink, the apparatus comprising:
   a first generating step of generating second color data by removing data that specifies isolated pixels to be printed with color ink, in which a predetermined number of pixels are not consecutively arranged in a predetermined direction, from the first color data;
   a second generating step of generating third color data by thinning-out data that specifies neighborhood pixels located in neighborhoods of the pixels to be printed with black ink in the second color data, based on the first black data; and
   a third generating step of generating fourth color data based on the third color data and the first color data.

8. The image processing method as claimed in claim 7, wherein the first generating step includes a first detection step of detecting non-isolated pixels by executing a logical product of data, which is obtained by executing a logical sum of data of adjacent pixels located above and below and to right and left of an object pixel, and data of the object pixel.

9. The image processing method as claimed in claim 7, wherein
   the second generating step includes a second detection step of detecting the neighborhood pixel in the second color data, and
   the second detection step detects an object pixel as the neighborhood pixel if a number of pixels to be printed with black ink which exist in a matrix of L×M (L, M=1, 3, 5, . . . , 2n−1, wherein n is natural number) containing an object pixel as a center pixel is greater than a predetermined number.

10. The image processing method as claimed in claim 7, wherein the second generating step thins-out data that specifies neighborhood pixels located in neighborhoods of the pixels to be printed with black ink in the second color data, by using a mask.

11. The image processing method as claimed in claim 7, wherein the third generating step generates the fourth data by executing logical product of the third color data and data obtained by inverting the first black data.

12. The image processing method as claimed in claim 7, wherein the color ink includes cyan ink, magenta ink, and yellow ink.

* * * * *